United States Patent
Gourlay et al.

(10) Patent No.: US 7,349,969 B2
(45) Date of Patent: *Mar. 25, 2008

(54) PHASED LEARNING APPROACH TO DETERMINING CLOSEST CONTENT SERVING SITES

(75) Inventors: Douglas Gourlay, San Jose, CA (US); James Aviani, Santa Barbara, CA (US)

(73) Assignee: Cisco Technology, Inc., San Jose, CA (US)

( * ) Notice: Subject to any disclaimer, the term of this patent is extended or adjusted under 35 U.S.C. 154(b) by 113 days.

This patent is subject to a terminal disclaimer.

(21) Appl. No.: 11/096,838

(22) Filed: Mar. 31, 2005

(65) Prior Publication Data

US 2005/0172011 A1 Aug. 4, 2005

Related U.S. Application Data

(63) Continuation of application No. 09/652,766, filed on Aug. 31, 2000, now Pat. No. 6,920,498.

(51) Int. Cl.
G06F 15/16 (2006.01)
G06F 15/173 (2006.01)
G06Q 30/00 (2006.01)

(52) U.S. Cl. .............. 709/227; 709/228; 709/224; 709/203; 709/241; 705/26

(58) Field of Classification Search .............. 709/227, 709/228
See application file for complete search history.

(56) References Cited

U.S. PATENT DOCUMENTS 5,014,265 A 5/1991 Hahne et al. ............. 370/60

(Continued)

OTHER PUBLICATIONS

Chowdhury, Shyamal, "Alternative Bandwidth Allocation Algorithms for Packet Video in ATM Networks", 1992, IEEE, pp. 1061-1068.

*Primary Examiner*—Bunjob Jaroenchonwanit
*Assistant Examiner*—Philip Lee
(74) *Attorney, Agent, or Firm*—Thelen Reid Brown Raysman & Steiner LLP; David B. Ritchie

(57) ABSTRACT

In order to direct content requests to an appropriate content serving site in a computer network, a phased learning approach is utilized to ensure that, as best as possible, the request is made to content serving site with the shortest delay. In a setup phase, an indirect path return geographic sever load balancer times queries to all of the individual content serving sites so that the queries all arrive at the content serving sites at the same time. Therefore, when the requesting fixed location receives communications from the content serving sites, it can easily tell which content serving site has the least delay by an established race condition. The winner of the race may then be relayed to the indirect path return geographic server load balancer for later usage. In an execution mode, only the m fastest content serving sites and n other sites (used to test random and new sites) are queried when a DNS request arrives from the requesting fixed location. The particular m fastest content serving sites and n other sites may be dynamically updated so as to ensure the most reliable directing of requests. This solution provides a very efficient and effective means by which to determine closest content serving sites while keeping load balancer-created traffic at a minimum.

16 Claims, 4 Drawing Sheets

U.S. PATENT DOCUMENTS

| | | | |
|---|---|---|---|
| 5,136,580 A | 8/1992 | Videlock et al. | 370/60 |
| 5,224,099 A | 6/1993 | Corbalis et al. | 370/94.2 |
| 5,280,470 A | 1/1994 | Buhrke et al. | 370/13 |
| 5,313,454 A | 5/1994 | Bustini et al. | 370/13 |
| 5,317,562 A | 5/1994 | Nardin et al. | 370/16 |
| 5,359,592 A | 10/1994 | Corbalis et al. | 370/17 |
| 5,485,455 A | 1/1996 | Dobbins et al. | 370/60 |
| 5,570,360 A | 10/1996 | Klausmeier et al. | 370/60 |
| 5,610,910 A | 3/1997 | Focsaneanu et al. | 370/351 |
| 5,666,353 A | 9/1997 | Klausmeier et al. | 370/230 |
| 5,715,394 A | 2/1998 | Jabs | 395/200.11 |
| 5,734,836 A | 3/1998 | Fujishima et al. | 395/200.81 |
| 5,812,529 A | 9/1998 | Czarnik et al. | 370/245 |
| 5,922,051 A | 7/1999 | Sidey | 709/223 |
| 5,953,708 A * | 9/1999 | Midorikawa et al. | 705/26 |
| 6,023,724 A | 2/2000 | Bhatia et al. | 709/218 |
| 6,304,913 B1 | 10/2001 | Rune | 709/241 |
| 6,324,580 B1 * | 11/2001 | Jindal et al. | 709/228 |
| 6,446,121 B1 * | 9/2002 | Shah et al. | 709/224 |
| 6,606,643 B1 * | 8/2003 | Emens et al. | 709/203 |

\* cited by examiner

PHASED LEARNING APPROACH TO DETERMINING CLOSEST CONTENT SERVING SITES

CROSS-REFERENCE TO RELATED APPLICATION

This application is a continuation of application Ser. No. 09/652,766, entitled "PHASED LEARNING APPROACH TO DETERMINING CLOSEST CONTENT SERVING SITES" by Douglas Gourlay and James Aviani, filed on Aug. 31, 2000 now U.S. Pat. No. 6,920,498.

BACKGROUND OF THE INVENTION

1. Field of the Invention

The present invention relates to the field of network communications. More specifically, the present invention relates to the use of a phased learning approach to determine the closest content serving site to a user or server.

2. The Background

In a distributed computer network, content sites may be distributed throughout a network, each site containing identical content to at least one of the other distributed sites. This allows for both load balancing among multiple sites as well as for faster connections as users may connect to a server which is closest (in terms of transit time) to their own computer.

This design has gained acceptance on the Internet, where it is routine for large content distributors to maintain multiple servering locations throughout the Internet. When one server is busy, traffic may merely be directed to a different server. Likewise, if one server is down for repairs, traffic may merely be directed to a different server. Finally, and perhaps most importantly, when multiple servers are available, the traffic may merely be directed to the server that is closest to the user.

When a user requests content that is located on multiple distributed servers, the server having the lowest round-trip response time to the user's DNS Server must be determined. FIG. 1 is a block diagram illustrating a situation where a user requests content located on multiple distributed servers. PC 2 may be attempting to access content at "www.example-.com". Thus, it first requests Domain Naming System (DNS) resolution from Client DNS Server 4. Then Client DNS Server 4 queries the root DNS to determine the authoritative DNS server for example.com.

The Client DNS Server 4 may then query the authoritative DNS server for the domain www.example.com, which returns an NS record for www.example.com. The Client DNS server 4 may then query the global server load balancer 6 for the "www.example.com" domain. At the global server load balancer 6, the various servers 8a, 8b, 8c containing the content are known. The global server load balancer 6 then may query each of the servers 8a, 8b, 8c. The sites then respond by each sending a TCP/IP syn/ack packet to the client DNS server 4. The client DNS server 4 then receives the TCP/IP syn/ack packet and sends a reset (RST) packet back to each server 8a, 8b, 8c, resetting the syn/ack. This flows from the Client DNS server 4 to each server 8a, 8b, 8c directly.

When the servers 8a, 8b, 8c each receive the RST packet back, they may compute their respective transit times (by using the difference between the time they originally sent the syn/ack packet and the time they received the RST packet back). This information may then be passed to the global server load balancer 6. The global server load balancer may then compare the transit times of all of the servers 8a, 8b, 8c, determine which is the lowest, and inform the client DNS server 4 of the resolved IP address of the lowest timed site. The client DNS server 4 may create a record to the PC containing the information indicating the server with the lowest transit time, at which point the PC may connect to the IP address for that server to retrieve the content.

This can be a fairly time consuming process, especially when the number of servers hosting the content grows larger. The relative lack of speed of the process may be bearable when there are only 3 servers hosting the content, but when there are 3000, the delays while waiting for servers to respond can be costly. Thus, what is needed is a solution that directs a user to the appropriate server in the least amount of time, especially as the number of servers grows large.

SUMMARY OF THE INVENTION

In order to direct content requests to an appropriate content serving site in a computer network, a phased learning approach is utilized to ensure that, as best as possible, the request is made to content serving site with the shortest delay. In a setup phase, an indirect path return geographic sever load balancer times queries to all of the individual content serving sites so that the queries all arrive at the content serving sites at the same time. Therefore, when the requesting fixed location receives communications from the content serving sites, it can easily tell which content serving site has the least delay by an established race condition. The winner of the race may then be relayed to the indirect path return geographic server load balancer for later usage. In an execution mode, only the m fastest content serving sites and n other sites (used to test random and new sites) are queried when a DNS request arrives from the requesting fixed location. The particular m fastest content serving sites and n other sites may be dynamically updated so as to ensure the most reliable directing of requests. This solution provides a very efficient and effective means by which to determine closest content serving sites while keeping load balancer-created traffic at a minimum.

DETAILED DESCRIPTION OF A PREFERRED EMBODIMENT

In the following description, a preferred embodiment of the invention is described with regard to preferred process steps and data structures. However, those skilled in the art will recognize, after perusal of this application, that embodiments of the invention may be implemented using at least one general purpose computer operating under program control and/or using a program storage device, and that modification of the general purpose computer to implement the components, process steps, and/or data structures described herein would not require undue invention.

In accordance with a specific embodiment of the present invention, the components, process steps, and/or data structures are implemented using software. This implementation is not intended to be limiting in any way. Different implementations may be used and may include other types of operating systems, computing platforms, and/or computer programs. In addition, those of ordinary skill in the art will readily recognize that devices of a less general purpose nature, such as hardwired devices, devices relying on FPGA (field programmable gate array) or ASIC (application specific integrated circuit) technology, or the like, may also be used without departing from the scope and spirit of the inventive concepts disclosed herewith.

The present invention utilizes a phased learning approach along with indirect path return geographic server load balancing technology in order to quickly and efficiently provide a user with a list of the fastest servers hosting the requested content.

Figure 1:
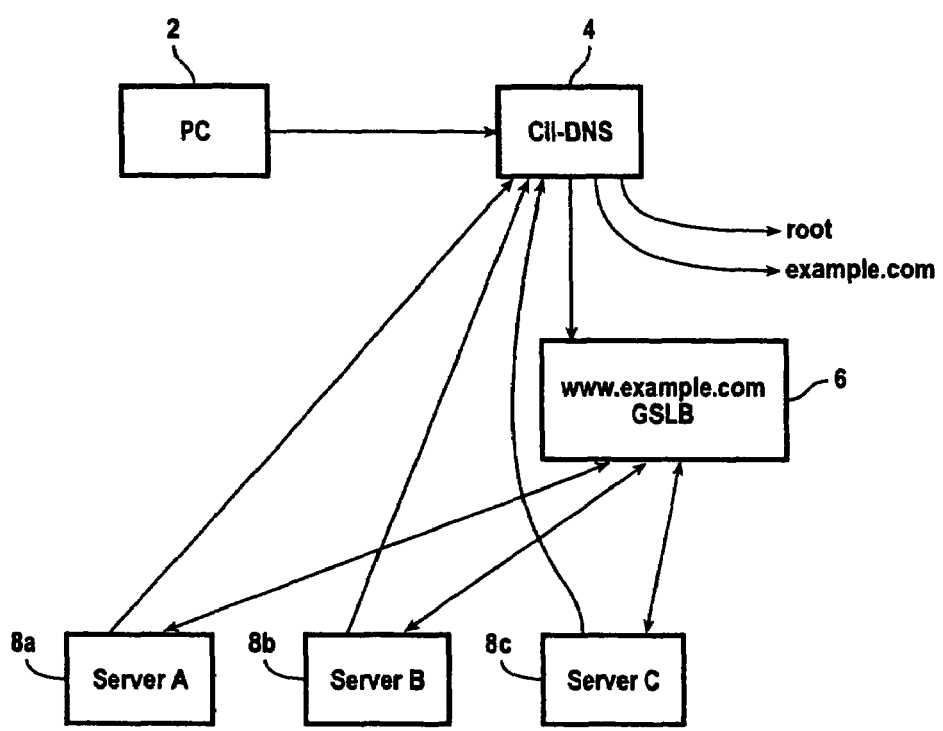
FIG. 1 is a block diagram illustrating a situation where a user requests content located on multiple distributed servers.
Figure 2:
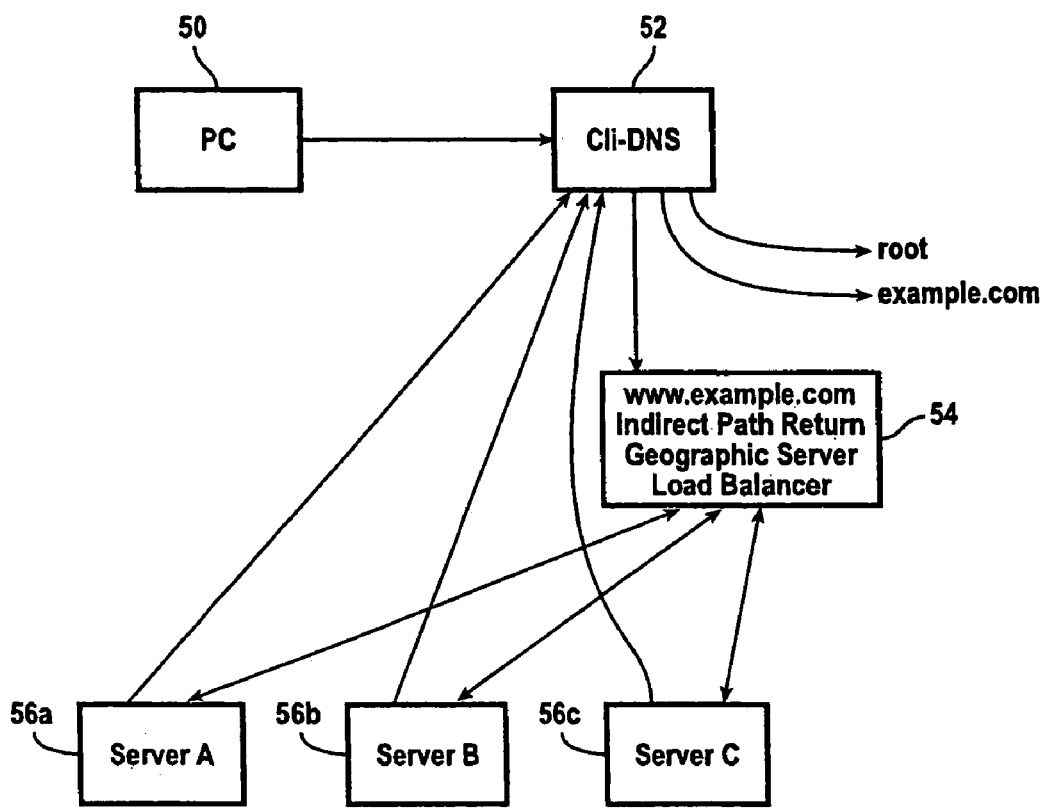
FIG. 2 is a block diagram illustrating a system utilizing indirect path return geographic server load balancing technology in accordance with a specific preferred embodiment of the present invention.

FIG. 2 is a block diagram illustrating a system utilizing indirect path return geographic server load balancing technology in accordance with a specific embodiment of the present invention. PC 50 attempts to access content at "www.example.com". Thus, it first requests Domain Naming System (DNS) resolution from Client DNS Server 52. Then Client DNS Server 52 queries the root DNS to determine the authoritative DNS Server for the requested domain. The Client DNS Server 52 may then query the authoritative DNS server for the domain "www.example.com". The Client DNS server 52 may then query the indirect path return geographic server load balancer 54 for the "www.example.com" domain. At the indirect path return geographic server load balancer 54, the various servers 56a, 56b, 56c containing the content are known. Additionally, the time it takes to send a packet from the indirect path return geographic server load balancer 54 to each of the various servers 56a, 56b, 56c is also known. This may be determined by pinging each of the servers and measuring the response times (the time it takes to receive a response back). Pinging may be done at regular intervals, to have on hand the most up-to-date information as to the response times of the various servers 56a, 56b, 56c.

With the knowledge of the response times of each server 56a, 56b, 56c, the indirect path return geographic server load balancer 54 may then precisely time queries to each of the servers 56a, 56b, 56c so that the queries are received at each of the servers 56a, 56b, 56c at exactly the same time. Thus if pinging determines that the response time for the servers 56a, 56b, and 56c are 100 ms, 20 ms, and 50 ms, respectively, then the indirect path return geographic server load balancer 54 will first send a query to server 56a, then wait 25 ms and send a query to server 56c (the difference in the response times between server 56a and 56c divided by 2 because the query is only traveling one-way), then wait another 15 ms and send a query to server 56b (difference in the response times between server 56a and 56b is 80 ms, divided by 2 gives 40 ms from the time the query to server 56a was sent). This ensures that the queries arrive at each of the servers 56a, 56b, and 56c at the same time.

Since the queries arrive at each of the servers 56a, 56b, 56c at the same time, the DNS responses from 56a, 56b, 56c to the client DNS server 52 may be sent at the same time. This creates what may be called a one-way race condition. In order to determine the server 56a, 56b, 56c with the fastest transit time, the client DNS server 52 need only determine the server from which the first DNS Response packet it receives came. When a server 56a, 56b, or 56c wins the race it is known to the server by the corresponding HTTP Request coming in from an IP address with similarity to the Client-DNS server. The winning of the one-way race triggers an update to the indirect path geographic server load balancer with the client DNS servers IP address and the transit time for the race to occur. The indirect path geographic server load balancer then adds this to an entry in its content routing table where it keeps the client-DNS server IP address mapped to the m fastest sites that responded to it.

One problem, however, with this solution occurs when a large number of servers are placed in the system. The indirect path return geographic server load balancer 54 must send requests to many or all of them, thus creating traffic that may actually interfere with the efficiency of the system, especially the client-DNS server. So while the time it takes to determine which is the fastest server when a user wishes to access content is greatly decreased, the overall speed of the servers may actually be slower.

In order to remedy this concern, only a certain number of servers will be "active" at any one time for each client-DNS server, treated as independent entities. "Active" means that the server is subject to receive a query from the indirect path return geographic server load balancer 54 for a particular client DNS server. In a specific embodiment of the present invention, 5 servers will be active at any one time for each client DNS server, although there can be overlap between different client DNS servers. The 5 servers will made up of the 3 servers having the lowest response time to the client-DNS server as well as 2 other servers used for testing (which will be described below).

Determining which servers are active will be performed using a phased learning approach. When the indirect path return geographic server load balancer 54 is first connected to the network or the network is otherwise "set up", the system is deemed to be in the setup phase. During the setup phase, all of the servers are sequentially tested as traffic comes in from different client-DNS IP addresses. All of the servers are pinged from the indirect path geographic server load balancer to determine their relative distance from the indirect path return geographic server load balancer. This data is stored in records at the indirect path return geographic server load balancer 54, each record comprising the halved ping time from a content server to the indirect path return geographic server load balancer. As the indirect path return geographic server load balancer receives the first request from a client-DNS server, it randomly selects 10 content servers to forward the equalized request to. These 10 servers respond back to the client DNS server establishing a race. The winner of this race is reported back to the indirect path return geographic server load balancer by the content server. The indirect path return geographic server load balancer 54 then adds a record to its table with the winning content server as an entry under the client DNS servers IP address with the transit time for it to respond and receive traffic. If space is a concern, then the number of records may be limited such as storing only the 3 fastest content servers and simply replacing a record corresponding to a particular content server if a faster server is found.

After the system has been set up, it still may be necessary to adjust which servers are active based on changes that occur within the network. Typical changes include high traffic to a particular server and addition or deletion of a server from the network. When the system is not in the setup phase, it is in the execution phase. During the execution phase, the 3 fastest servers are active at all times for each client-DNS server. The two extra slots are used for testing random servers in a stable network (no servers added or deleted). If one of the random servers tested winds up having a lower transit time than one of the three fastest servers, then it will supplant the slowest of the three fastest servers. If a new server is added to the system, it will be immediately added to one of the two extra slots so it can be tested until has become one of the fastest servers mapped to a client-DNS server. Just like with the random servers, if the new server tests out with a lower transit time than one of the three fastest servers, then it will supplant the slowest of the three fastest servers.

It should be noted that it is not necessary that the number of active servers be 5. Any number will work, and the number may have to be varied for different applications in different systems. Additionally, the number of extra slots to use may also be varied.

Furthermore, it may be advantageous at times to make the number of active servers dynamic. If there is a high rate of change in the list of fastest servers, it indicates that the network may not be stable. This may be used as an indicator to a system administrator that action needs to be taken to examine the root of the instability in the system. During this instability, it may be preferable to increase the number of servers in the list of fastest servers so the rate of change can be mitigated as the available pool of servers to be tested for each iteration is increased. The number may be scaled back down when stability returns to the system.

Figure 3:
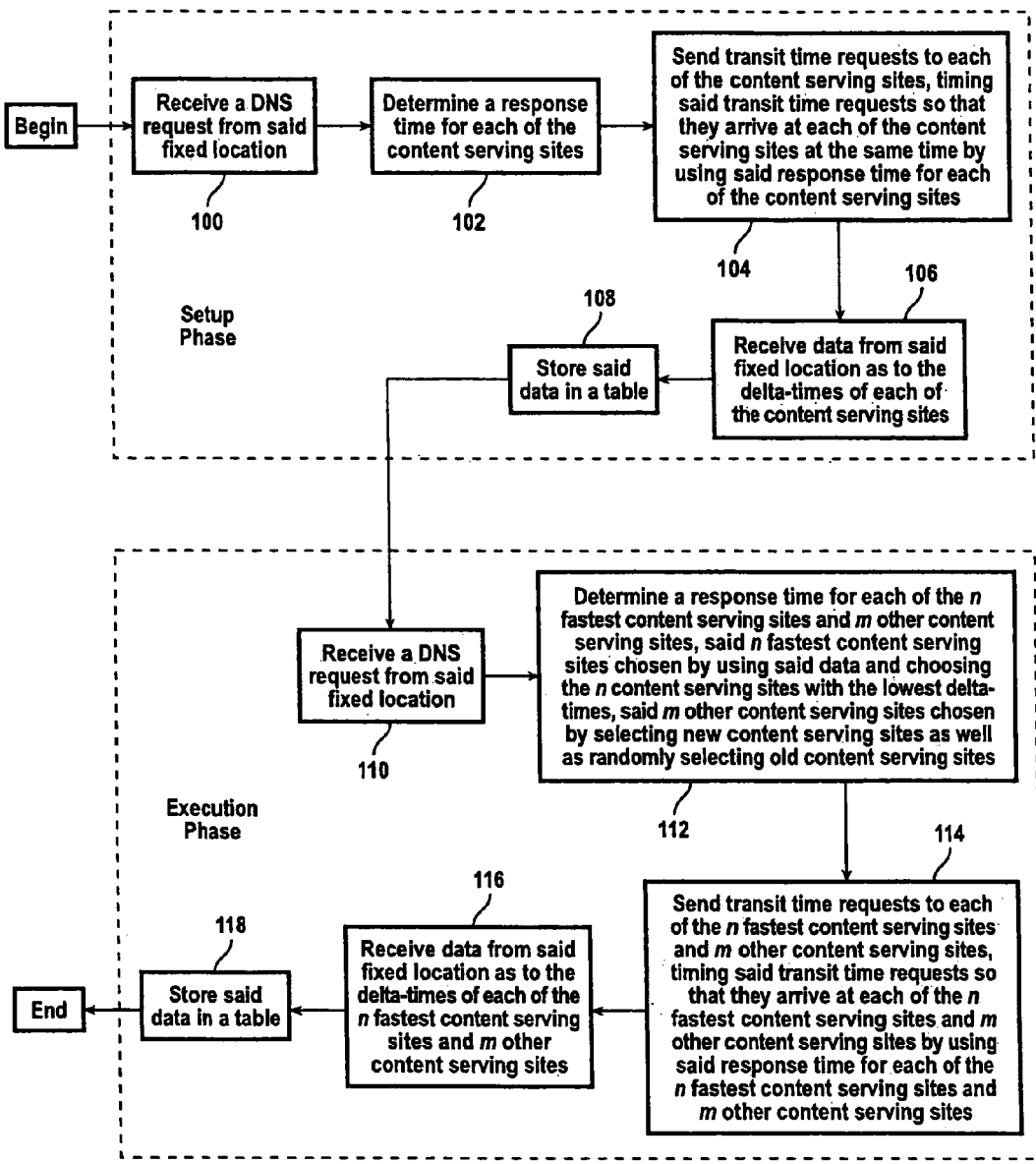
FIG. 3 is a flow diagram illustrating a method for using a phased learning approach for determining the closest content serving sites to a fixed location in a computer network in accordance with a specific embodiment of the present invention.

FIG. 3 is a flow diagram illustrating a method for using a phased learning approach for determining the closest content serving sites to a fixed location in a computer network in accordance with a specific embodiment of the present invention. This method may be performed by an indirect path return geographic server load balancer.

The system begins in a setup phase, when the computer network (or a portion thereof) is first setup. However, setup mode may also be entered into whenever an administrator wishes to test the network. Thus, if a new version of the indirect path return geographic server load balancer or the table has been erased, the administrator may wish to enter setup mode even though it is not the first time the network is setup.

The fixed location will generally be a PC and client DNS server combination. However, as the computer network grows more complex, there may be a need to serve content to other devices, such as gateways, routers, etc. Thus the term "fixed location" should not be limited to PCs and client DNS servers. At 100, a DNS request is received from the fixed location. Even though the system is in the setup phase, there still needs to be a fixed location defined for testing purposes. At 102, a response time is determined for each of the content serving sites. This is determined by pinging each of the content serving sites and then measuring the time it takes to receive a reply back from each of the content serving sites. That time is the response time for each content serving site.

At 104, queries are sent to each of the content serving sites, timing the queries so that they arrive at each of the content serving sites at the same time by using said response time for each of the content serving sites. This is accomplished by querying the content serving sites in order of their response times, longest response time first. The query for a particular content serving site is delayed from the query for the content serving site with the longest response time for a time equal to one half of the particular content serving site's response time.

At 106, data is received from the fixed location as to the transit times of each of the content serving sites. The fixed location would have measured these transit times by tracking when a response from each of the content serving sites was received (the response from each of the content serving sites being generated upon receipt of the query from the indirect path return geographic server load balancer). The data may be in a form of a record listing the IP address of fixed location, the transit time from a particular content serving site, and the IP address of that particular content serving site. At 108, the data may then be stored in table for later use.

When the network is operating normally, the system may be in the execution phase. At 110, a DNS request is received from the fixed location. At 112, a response time is determined for each of n fastest content serving sites and m other content serving sites, said n fastest content serving sites chosen by using said data and choosing the n content serving sites with the lowest transit times, said m other content serving sites chosen by selecting new content serving sites as well as randomly selecting old content serving sites. Thus, whenever a new content serving site is added to the network it will become one of the m other content serving sites until it has been tested once. Determining the response time is accomplished by pinging each of the n fastest content serving sites and m other content serving sites and then measuring the time it takes to receive a reply back from each of the n fastest content serving sites and m other content serving sites. That time is the response time for each of n fastest content serving site and m other content serving sites.

At 114, queries are sent to each of n fastest content serving sites and m other content serving sites, timing the queries so that they arrive at each of the n fastest content serving sites and m other content serving sites at the same time by using said response time for each of the n fastest content serving sites and m other content serving sites. This is accomplished by querying the n fastest content serving sites and m other content serving sites in order of their response times, longest response time first. The query for a particular n fastest content serving sites or m other content serving sites is delayed from the query for the n fastest content serving sites or m other content serving sites with the longest response time for a time equal to one half of the particular content serving site's response time.

At 116, data is received from the fixed location as to the transit times of each of the n fastest content serving sites and m other content serving sites. The fixed location would have measured these transit times by tracking when a response from each of the n fastest content serving sites and m other content serving sites was received (the response from the n fastest content serving sites and m other content serving sites being generated upon receipt of the query from the indirect path return geographic server load balancer). The data may be in a form of a record listing the IP address of fixed location, the transit time from a particular content serving site, and the IP address of that particular content serving site. At 118, the data may then be stored in table for later use.

In a specific embodiment of the present invention, n is 3 and m is 2. However, as discussed earlier, in some situations it is preferable to have these numbers be dynamic.

Figure 4:
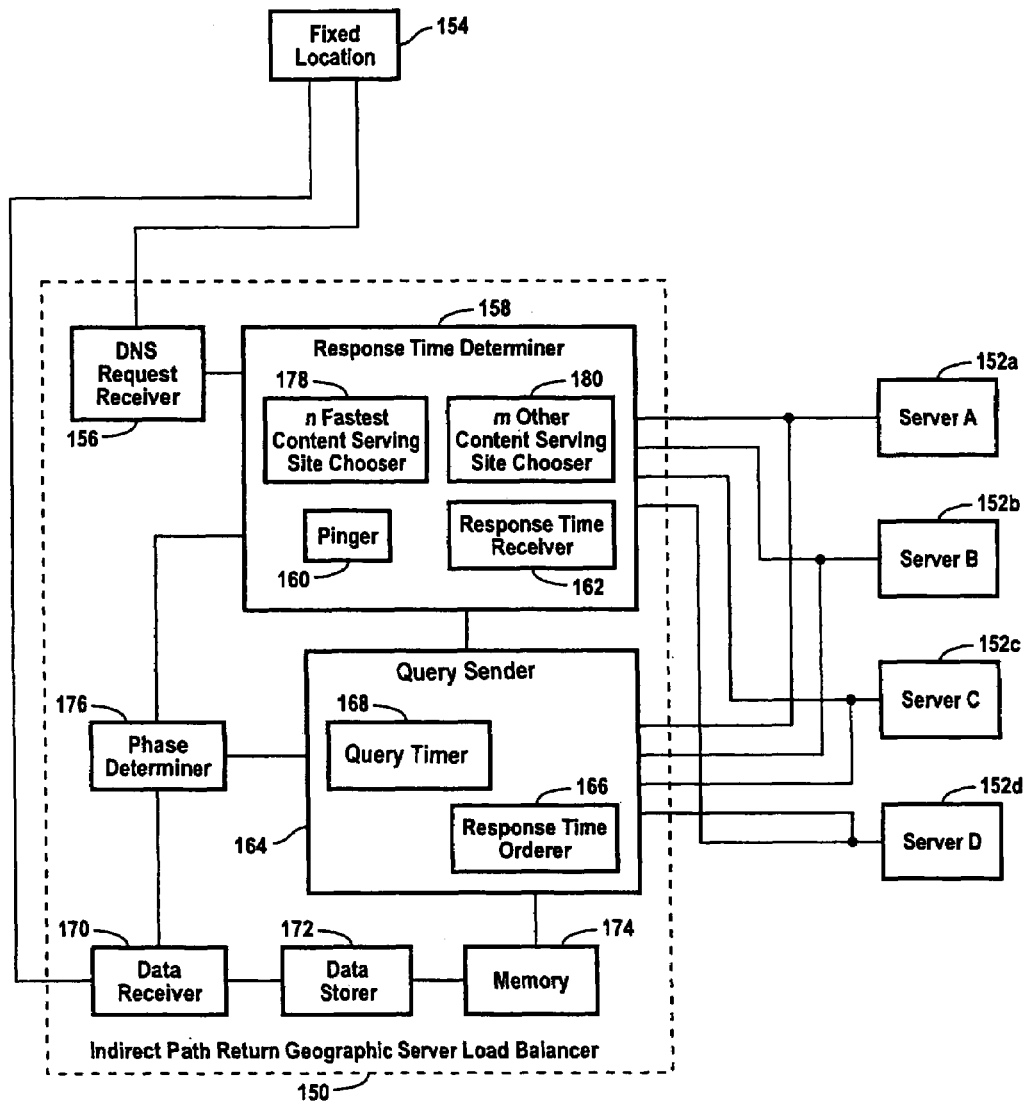
FIG. 4 is a block diagram illustrating an apparatus for using a phased learning approach for determining the closest content serving sites to a fixed location in a computer network in accordance with a specific embodiment of the present invention.

FIG. 4 is a block diagram illustrating an apparatus for using a phased learning approach for determining the closest content serving sites to a fixed location in a computer network in accordance with a specific embodiment of the present invention. An indirect path return geographic server load balancer 150 may be located in a network with content serving sites 152a, 152b, 152c, 152d and a fixed location 154.

The system begins in the setup phase, when the computer network (or a portion thereof) is first setup. However, setup mode may also be entered into whenever an administrator wishes to test the network. Thus, if a new version of the indirect path return geographic server load balancer or the table has been erased, the administrator may wish to enter setup mode even though it is not the first time the network is setup.

The fixed location will generally be a PC and client DNS server combination. However, as the computer network grows more complex, there may be a need to serve content to other devices, such as gateways, routers, etc. Thus the term "fixed location" should not be limited to PCs and client DNS servers. A DNS request receiver 156 coupled to the fixed location 154 receives a DNS request from the fixed location 154. Even though the system is in the setup phase, there still needs to be a fixed location defined for testing purposes. A response time determiner 158 coupled to said DNS request receiver 156 and to the content serving sites 152a, 152b, 152c, 152d determines a response time for each of the content serving sites 152a, 152b, 152c, 152d. This is determined by using a pinger 160 to ping each of the content serving sites 152a, 152b, 152c, 152d and then measuring the time it takes to receive a reply back at a response time receiver 162 from each of the content serving sites. That time is the response time for each content serving site.

A query sender 164 coupled to said response timer determiner 162 and to the content serving sites 152a, 152b, 152c, 152d sends queries to each of the content serving sites 152a, 152b, 152c, 152d, timing the queries so that they arrive at each of the content serving sites at the same time by using said response time for each of the content serving sites. This is accomplished by ordering the content serving sites in order of their response times, longest response time first, using a response timer orderer 166, and then timing the queries with a query timer 168. The query for a particular content serving site is delayed from the query for the content serving site with the longest response time for a time equal to one half of the particular content serving site's response time.

A data receiver 170 coupled to the fixed location 154 receives data from the fixed location 154 as to the transit times of each of the content serving sites. The fixed location 154 would have measured these transit times by tracking when a response from each of the content serving sites 152a, 152b, 152c, 152d was received (the response from each of the content serving sites 152a, 152b, 152c, 152d being generated upon receipt of the query from the indirect path return geographic server load balancer 150). The data may be in a form of a record listing the IP address of fixed location, the transit time from a particular content serving site, and the IP address of that particular content serving site. A data storer 172 coupled to said data receiver 170 and to a memory 174 may store the data in a table in memory 174 for later use.

When the network is operating normally, the system may be in the execution phase. In order to distinguish between the two phases, a phase determiner 176 coupled to said response time determiner 158, said query sender 164, and said data receiver 170, is provided. In the execution phase, the DNS request receiver 156 receives a DNS request from the fixed location 154. The response time determiner 158 may then determine a response time for each of n fastest content serving sites and m other content serving sites, said n fastest content serving sites chosen by using said data and choosing the n content serving sites with the lowest transit times, said m other content serving sites chosen by selecting new content serving sites as well as randomly selecting old content serving sites. This choosing of the fastest content serving sites may be accomplished by using an n fastest content serving site chooser 178, which may access the memory 174 to aid in its determination. Additionally, an m other content serving site chooser 180 may be provided to choose which new/random sites to have active. Thus, whenever a new content serving site is added to the network it will become one of the m other content serving sites until it has been tested once.

Determining the response time is accomplished by pinging each of the n fastest content serving sites and m other content serving sites using the pinger 160 and then measuring the time it takes to receive a reply back at said response timer receiver 162 from each of the n fastest content serving sites and m other content serving sites. That time is the response time for each of n fastest content serving site and m other content serving sites.

The query sender 164 sends queries to each of n fastest content serving sites and m other content serving sites, timing the queries so that they arrive at each of the n fastest content serving sites and m other content serving sites at the same time by using said response time for each of the n fastest content serving sites and m other content serving sites. This is accomplished by querying the n fastest content serving sites and m other content serving sites in order of their response times, longest response time first, using said response time orderer. The query for a particular n fastest content serving sites or m other content serving sites is delayed from the query for the n fastest content serving sites or m other content serving sites with the longest response time for a time equal to one half of the particular content serving site's response time.

The data receiver 170 receives data from the fixed location 154 as to the transit times of each of the n fastest content serving sites and m other content serving sites. The fixed location 154 would have measured these transit times by tracking when a response from each of the n fastest content serving sites and m other content serving sites was received (the response from the n fastest content serving sites and m other content serving sites being generated upon receipt of the query from the indirect path return geographic server load balancer). The data may be in a form of a record listing the IP address of fixed location, the transit time from a particular content serving site, and the IP address of that particular content serving site. A data storer 172 coupled to said data receiver 170 and to a memory 174 may store the data in a table in memory 174 for later use.

In a specific embodiment of the present invention, n is 3 and m is 2. However, as discussed earlier, in some situations it is preferable to have these numbers be dynamic.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. An apparatus for using a phased learning approach for determining closest of s multiple content serving sites to a client DNS server in a computer network including:

a memory;

a query sender configured to, in a setup phase, store data as to transit times of each of the s multiple content serving sites in a table when the transit times are determined;

a response time determiner coupled to the query sender and configured to, in an execution phase, determine a response time for each of n fastest content serving sites and m other content serving sites, the n fastest content serving sites chosen by examining the transit times of each of the s multiple content serving sites for which the transit times have already been determined and choosing n content serving sites with lowest transit times, the m other content serving sites including new content serving sites for which the transit times have not yet been determined and including one or more randomly selected content serving sites for which the transit times have already been determined, wherein n is less than s and greater than zero; and wherein the query sender is further configured to, in the execution phase, send queries to each of the n fastest content serving sites and m other content serving sites, timing the queries so that they arrive at each of the n fastest content serving sites and m other content serving sites at the same times by using the response time for each of the n fastest content serving sites and m other content serving sites;

wherein transit times of each of the n fastest content serving sites and m other content serving sites determined in response to the timing the queries are stored in the table. (see page 15 of the specification for support).

2. The apparatus of claim 1, further comprising a data receiver configured to, in an execution phase, receive data from the client DNS server as to the transit times of each of the n fastest content serving sites and m other content serving sites.

3. The apparatus of claim 2, further comprising:

a data storer coupled to the memory, the data storer configured to, in an execution phase, store the data received from the client DNS server in the table.

4. The apparatus of claim 3, wherein the response time determiner is further configured to, in the setup phase, determine a response time for each of the content serving sites.

5. The apparatus of claim 4, wherein the query sender is further configured to, in the setup phase, send queries to each of the content serving sites, timing the queries so that they arrive at each of the content serving sites at the same time by using the response time for each of the content serving sites.

6. The apparatus of claim 5, wherein the data receiver is further configured to, in a setup phase, receive data from the client DNS server as to the transit times of each of the content serving sites in the table.

7. The apparatus of claim 4, wherein the response time determiner is further configured to, in the setup phase:

ping each of the content serving sites;

receive a reply from each of the content serving sites; and determine the response time for each of the content serving sites by computing the difference in time from the pinging to the receiving a reply for each of the content serving sites.

8. The apparatus of claim 1, wherein the response time determiner is further configured to, in the execution phase:

ping each of the n fastest content serving sites and m other content serving sites;

receive a reply from each of the n fastest content serving sites and m other content serving sites; and determine the response time for each of n fastest content serving sites and m other content serving sites by computing the difference in time from the pinging to the receiving a reply for each of the n fastest content serving sites and m other content serving sites.

9. The apparatus of claim 1, wherein transit time is the time it takes a content serving site to send a packet to the client DNS server after receiving a query.

10. The apparatus of claim 1, wherein the data includes at least one record, the record including a transit time, a network address for the client DNS server, and a network address for a content serving site, the transit time being the transit time between the client DNS server and the content serving site.

11. The apparatus of claim 3, wherein the response time determiner is further configured to, in the setup phase, send queries to each of the content serving sites in order of their response times, longest response time first, setting a delay for a query for a particular content serving site from a time of the query to the content serving site with the longest response time as one half of he particular content serving site's response time.

12. The apparatus of claim 1, wherein the response time determiner is further configured to, in the execution phase, send queries to each of the n fastest content serving sites and m other content serving sites in order of their response times, longest response time first, setting a delay for a query to a particular content serving site from a time of the query to the n fastest content serving site or m other content serving site with the longest response time as one half of the particular content serving site's response time.

13. The apparatus of claim 1, wherein n may be varied based on stability of the computer network.

14. The apparatus of claim 1, wherein n may be varied based on a rate of change of the content serving sites making up n content serving sites.

15. The apparatus of claim 1, wherein the setup phase occurs when the computer network is first set up.

16. The apparatus of claim 1, wherein the execution phase occurs when the computer network is operating normally.

* * * * *